United States Patent
Alban et al.

(10) Patent No.: US 9,857,023 B2
(45) Date of Patent: Jan. 2, 2018

(54) MOUNTING ASSEMBLY FOR MOUNTING AN ANTENNA

(71) Applicant: Preformed Line Products, Mayfield Village, OH (US)

(72) Inventors: Rebecca Marie Alban, Columbia Station, OH (US); Jay David Duffy, Cleveland Heights, OH (US); Robert John Peterson, Chardon, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 15/006,235

(22) Filed: Jan. 26, 2016

(65) Prior Publication Data

US 2017/0211745 A1    Jul. 27, 2017

(51) Int. Cl.
| | |
|---|---|
| *H01Q 1/12* | (2006.01) |
| *F16M 13/02* | (2006.01) |
| *F16M 11/04* | (2006.01) |
| *F16M 11/20* | (2006.01) |
| *H01Q 3/04* | (2006.01) |

(52) U.S. Cl.
CPC ........ *F16M 13/022* (2013.01); *F16M 11/043* (2013.01); *F16M 11/2092* (2013.01); *H01Q 1/1207* (2013.01); *H01Q 3/04* (2013.01)

(58) Field of Classification Search
CPC ........ H01Q 1/1235; H01Q 1/10; H01Q 1/103; H01Q 1/1207; F16M 11/04; F16M 11/043; F16M 11/242
USPC ...... 248/218.4, 512; 343/878, 890, 880, 883
See application file for complete search history.

(56) References Cited

U.S. PATENT DOCUMENTS

| | | | | |
|---|---|---|---|---|
| 5,787,673 | A * | 8/1998 | Noble ................... | E04H 12/085 343/890 |
| 6,037,913 | A * | 3/2000 | Johnson ............... | H01Q 1/1207 248/278.1 |
| 7,086,207 | B2 * | 8/2006 | Piburn ................. | H01Q 1/1207 248/512 |

(Continued)

FOREIGN PATENT DOCUMENTS

| | | |
|---|---|---|
| AU | 2002100272 A4 | 5/2002 |
| FR | 2827328 A1 | 1/2003 |
| WO | 2015008900 A1 | 1/2015 |

OTHER PUBLICATIONS

Int. Search Report/Written Opinion cited in PCT Application No. PCT/US2017/015016 dated Apr. 24, 2017, 14 pgs.

*Primary Examiner* — Todd M Epps
(74) *Attorney, Agent, or Firm* — Cooper Legal Group, LLC (57) ABSTRACT

A mounting assembly for mounting an antenna to a support structure includes an attachment bracket coupled to a support structure. The mounting assembly includes a support member coupled to the attachment bracket and extending along a support member axis. The support member has a body defining a substantially hollow interior that extends substantially co-axially along the support member axis. A support arm supports an antenna. The support arm is received within the substantially hollow interior of the support member. The support arm is in a locked position or an unlocked position relative to the support member. In the locked position, the support arm is fixed with respect to the support member. In the unlocked position, the support arm is movable with respect to the support member along the support member axis.

20 Claims, 5 Drawing Sheets

(56) References Cited

U.S. PATENT DOCUMENTS

| | | | |
|---|---|---|---|
| 7,113,145 B1* | 9/2006 | Noble | H01Q 1/1228 248/218.4 |
| 7,659,865 B2* | 2/2010 | Kreitzberg | H01Q 1/1235 343/880 |
| 2007/0261355 A1* | 11/2007 | Carlisle | H01Q 1/1242 52/633 |
| 2008/0278402 A1* | 11/2008 | Kreitzberg | H01Q 1/1235 343/880 |
| 2016/0060912 A1* | 3/2016 | Matthews | F41B 15/027 70/14 |

* cited by examiner

MOUNTING ASSEMBLY FOR MOUNTING AN ANTENNA

TECHNICAL FIELD

The instant application is directed towards a mounting assembly. For example, the instant application is directed towards a mounting assembly for mounting an antenna.

BACKGROUND

Mounting assemblies may be used to mount one or more structures. Mounting assemblies may be used, for example, to mount an antenna to a tower.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a mounting assembly for mounting an antenna to a support structure is provided. The mounting assembly comprises an attachment bracket configured to be coupled to a support structure. The mounting assembly comprises a support member coupled to the attachment bracket and extending along a support member axis. The support member has a body defining a substantially hollow interior that extends substantially co-axially along the support member axis. The mounting assembly comprises a support arm for supporting an antenna. The support arm is received within the substantially hollow interior of the support member. The support arm is configured to be in a locked position or an unlocked position relative to the support member. In the locked position, the support arm is fixed with respect to the support member. In the unlocked position, the support arm is configured to be movable with respect to the support member along the support member axis.

In an example, a mounting assembly for mounting an antenna to a support structure is provided. The mounting assembly comprises an attachment bracket configured to be coupled to a support structure. The attachment bracket comprises a first attachment plate and a second attachment plate spaced apart to define an attachment opening into which the support structure is received. The attachment bracket is configured to be in a locked position or an unlocked position relative to the support structure. In the locked position, the attachment bracket is fixed with respect to the support structure. In the unlocked position, the attachment bracket is configured to be movable with respect to the support structure. A support member is coupled to the attachment bracket. A support arm is provided for supporting an antenna. The support arm is attached to the support member and is configured to be movable with respect to the support member.

In an example, a mounting assembly for mounting an antenna to a support structure is provided. The mounting assembly comprises an attachment bracket configured to be coupled to a support structure. A support member is coupled to the attachment bracket and extends along a support member axis. The support member has a body defining a substantially hollow interior that extends substantially co-axially along the support member axis. A support arm is received within the substantially hollow interior of the support member. The support arm is configured to be movable with respect to the support member along the support member axis. An antenna mounting bracket for mounting an antenna to the support arm is provided. The antenna mounting bracket has a bracket body defining a substantially hollow bracket interior that extends substantially co-axially along the support member axis. The support arm is received within the substantially hollow bracket interior of the antenna mounting bracket. The antenna mounting bracket is configured to be in a locked position or an unlocked position relative to the support arm. In the locked position, the antenna mounting bracket is fixed with respect to the support arm. In the unlocked position, the antenna mounting bracket is configured to be movable with respect to the support arm along the support member axis.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Figure 1:
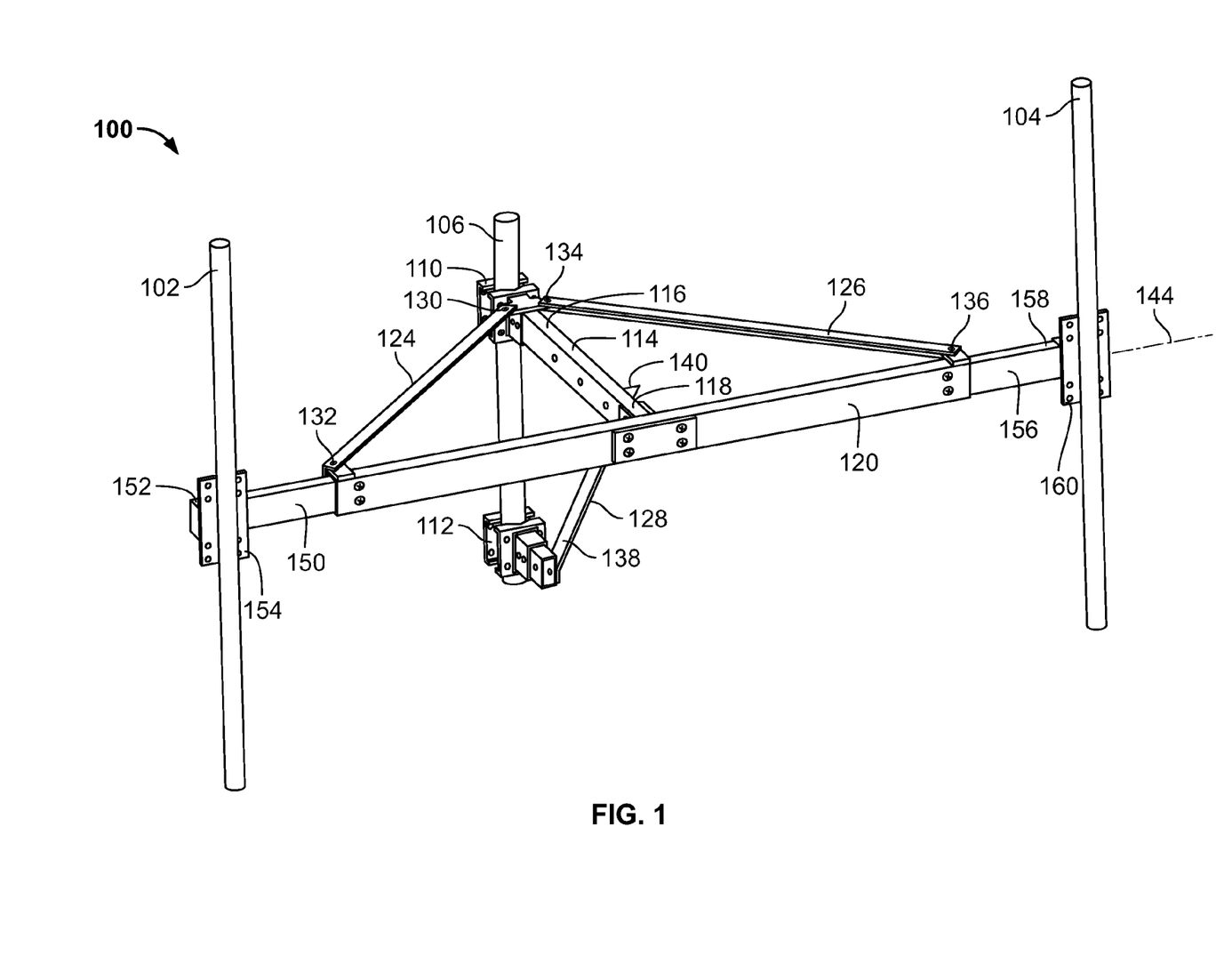
FIG. 1 is an illustration of an example mounting assembly.

Referring to FIG. 1, an example mounting assembly 100 is illustrated. The mounting assembly 100 can be used for mounting one or more antenna poles (e.g., a first antenna pole 102 and a second antenna pole 104) to a support structure 106. The antenna poles 102, 104 can support antennas, such as by an antenna being attached to the first antenna pole 102 and the same antenna or a different antenna being attached to the second antenna pole 104. The antennas may comprise, for example, an electrical device that can convert electric power into radio waves and vice versa. The antennas can be used in association with radio broadcasting, broadcast television, two-way radio, communications receivers, radar, cell phones, satellite communications, etc. In the illustrated example, the antennas can be used as part of a cellular network.

In an example, the support structure 106 can comprise a portion of a tower, such as a cellular tower. The support structure 106 can support one or more structures, components, devices, etc. that are related to the transmission and/or reception of one or more signals. In this example, the support structure 106 can support the first antenna pole 102 and the second antenna pole 104. The support structure 106 can be elevated and may also support transceivers, digital signal processors, control electronics, a GPS receiver, power sources, etc. In the illustrated example, the support structure 106 is an elongated, vertically extended structure that has a substantially circular cross-sectional shape. However, it will be appreciated that in other examples, the support structure 106 comprises any number of sizes, shapes, constructions, etc.

The mounting assembly 100 can comprise one or more attachment brackets. In an example, the mounting assembly 100 comprises an attachment bracket 110 and a second attachment bracket 112. The attachment bracket 110 and the second attachment bracket 112 may be coupled to the support structure 106. In an example, the attachment bracket 110 and/or the second attachment bracket 112 can be movable with respect to the support structure 106. That is, in an example, the attachment bracket 110 and/or the second attachment bracket 112 can be moved upwardly or downwardly with respect to the support structure 106.

The mounting assembly 100 comprises an attachment arm 114. The attachment arm 114 is coupled to the attachment bracket 110 at a first end 116 and extends in a direction outwardly from the support structure 106. In an example, the attachment arm 114 can extend in a direction that is substantially perpendicular to a direction along which the support structure 106 extends. A second end 118 of the attachment arm 114 can be coupled to a support member 120. The support member 120 can extend in a direction that is substantially perpendicular to a direction along which the attachment arm 114 extends. In this example, the support member 120 and the support structure 106 can extend substantially perpendicular with respect to each other.

The mounting assembly 100 comprises a support brace 124, a second support brace 126, and a third support brace 128. In an example, the support brace 124 and the second support brace 126 can extend between the attachment bracket 110 and the support member 120. For example, a first end 130 of the support brace 124 may be coupled to the attachment bracket 110 while a second end 130 of the support brace 124 may be coupled to the support member 120. In this example, a first end 134 of the second support brace 126 may be coupled to the attachment bracket 110 while a second end 126 of the second support brace 126 may be coupled to the support member 120. The support brace 124 and the second support brace 126 may extend non-parallel with respect to each other and with respect to the attachment arm 114. For example, the support brace 124 and the second support brace 126 can form an angle with respect to each other that is between about 70 degrees to about 170 degrees.

The third support brace 128 can extend between the second attachment bracket 112 and the support member 120. For example, a first end 138 of the third support brace 128 may be coupled to the second attachment bracket 112 while a second end 140 of the third support brace 128 may be coupled to the support member 120. The third support brace 128 may extend non-parallel with respect to the support brace 124, the second support brace 126, and the attachment arm 114. In an example, the third support brace 128 can form an angle with respect to the attachment arm 114 that is between about 0 degrees to about 90 degrees, and may be between about 20 degrees to about 70 degrees.

The support member 120 can be coupled to the second end 132 of the support brace 124, the second end 136 of the second support brace 126 and the second end 140 of the third support brace 128. In an example, the support member 120 may be coupled to the attachment bracket 110 via the attachment arm 114, the support brace 124, and the second support brace 126. The support member 120 may be coupled to the second attachment bracket 112 via the third support brace 128. In this way, the support member 120 can be supported in a substantially fixed position with respect to the support structure 106. In an example, the support member 120 can extend along a support member axis 144.

The mounting assembly 100 comprises a support arm 150 for supporting the first antenna pole 102. In an example, the first antenna pole 102 is attached to an end 152 of the support arm 150 by an antenna mounting bracket 154, while an opposing end of the support arm 150 is received within an interior of the support member 120. The mounting assembly 100 may comprise a second support arm 156 for supporting the second antenna pole 104. In an example, the second antenna pole 104 is attached to an end 158 of the second support arm 156 by a second antenna mounting bracket 160, while an opposing end of the second support arm 156 is received within an interior of the support member 120.

Figure 2:
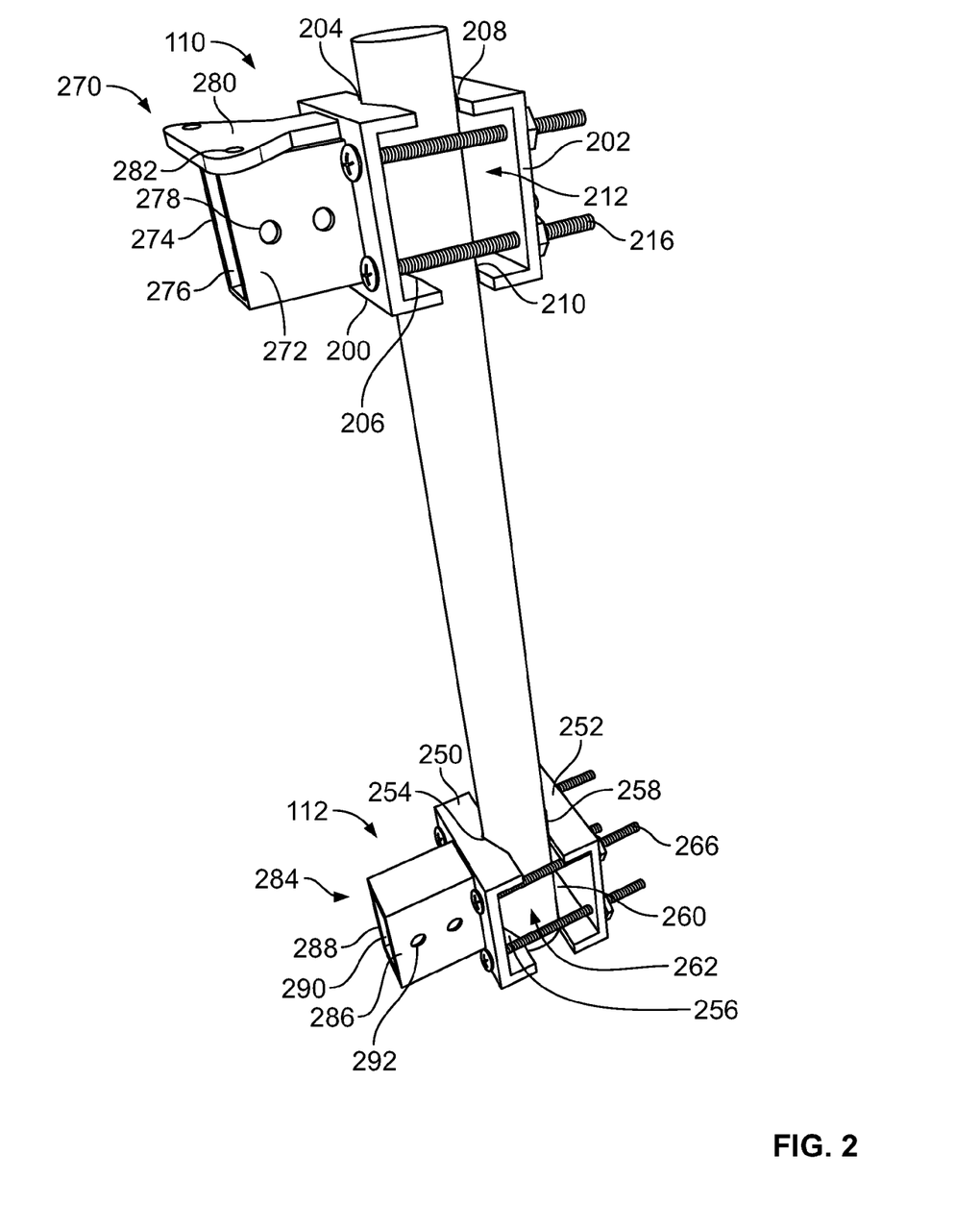
FIG. 2 is an illustration of a portion of an example mounting assembly.

Referring to FIG. 2, the attachment bracket 110 and the second attachment bracket 112 are illustrated as being coupled to the support structure 106. In this example, the attachment bracket 110 comprises a first attachment plate 200 and a second attachment plate 202. The first attachment plate 200 comprises a first contoured portion 204 and a second contoured portion 206. The first contoured portion 204 and the second contoured portion 206 can project outwardly from a wall of the first attachment plate 200 towards the support structure 106. In an example, the contoured portions of the first attachment plate 200 may be sized/shaped to substantially match an outer surface of the support structure 106. In this example, the support structure 106 has a substantially circular cross-sectional size. As such, the first contoured portion 204 and the second contoured portion 206 can have rounded shapes that substantially match the rounded shape of the support structure 106. In an example, the first contoured portion 204 is located at an upper end of the first attachment plate 200 while the second contoured portion 206 is located at a lower end of the first attachment plate 200. As such, the first contoured portion 204 and the second contoured portion 206 are spaced a distance apart, with a recess, a gap, an opening, a channel, etc. defined therebetween.

The second attachment plate 202 comprises a third contoured portion 208 and a fourth contoured portion 210. The third contoured portion 208 and the fourth contoured portion 210 can project outwardly from a wall of the second attachment plate 202 towards the support structure 106. In an example, the contoured portions of the second attachment plate 202 may be sized/shaped to substantially match an outer surface of the support structure 106. In this example, the third contoured portion 208 and the fourth contoured portion 210 can have rounded shapes that substantially match the rounded shape of the support structure 106. In an example, the third contoured portion 208 is located at an upper end of the second attachment plate 202 while the fourth contoured portion 210 is located at a lower end of the second attachment plate 202. As such, the third contoured portion 208 and the fourth contoured portion 210 are spaced a distance apart, with a recess, a gap, an opening, a channel, etc. defined therebetween.

The first attachment plate 200 and the second attachment plate 202 can be spaced apart to define an attachment opening 212 into which the support structure 106 is received. In this example, the support structure can contact the first contoured portion 204 and the second contoured portion 206 of the first attachment plate 200, and the third contoured portion 208 and the fourth contoured portion 210 of the second attachment plate 202.

The attachment bracket 110 may comprise one or more fasteners 216 that can couple the first attachment plate 200 and the second attachment plate 202. In an example, the one or more fasteners 216 can be positioned on opposing sides of the support structure 106, such that the support structure 106 is positioned between a first pair of fasteners and a second pair of fasteners. The fasteners 216 can extend through one or more openings in the first attachment plate 200 and the second attachment plate 202, such that when the fasteners 216 are tightened, the first attachment plate 200 and the second attachment plate 202 can exert a compressive force onto the support structure 106. As used herein, the term "fasteners" may comprise screws, bolts, nuts, etc. and/or other types of mechanical structures that can join or affix two or more objects/structures together. Indeed, the fasteners illustrated in FIGS. 1 to 6 are not intended to be limiting, but, instead, are merely exemplary, as other types of fasteners are envisioned.

The attachment bracket 110 can be selectively positioned in a locked position or an unlocked position relative to the support structure 106. For example, in the locked position, the fasteners 216 can be tightened such that the first attachment plate 200 and the second attachment plate 202 exert the compressive force onto the support structure 106. In the locked position, this compressive force may be sufficient such that the attachment bracket 110 is fixed with respect to the support structure 106. In the unlocked position, the fasteners 216 may be loosened such that the first attachment plate 200 and the second attachment plate 202 do not exert enough of a compressive force onto the support structure 106 to fix the attachment bracket 110 with respect to the support structure 106. Rather, in the unlocked position, the attachment bracket 110 may be movable with respect to the support structure 106.

The second attachment bracket 112 comprises a third attachment plate 250 and a fourth attachment plate 252. The third attachment plate 250 comprises a fifth contoured portion 254 and a sixth contoured portion 256. The fifth contoured portion 254 and the sixth contoured portion 256 can project outwardly from a wall of the third attachment plate 250 towards the support structure 106. In an example, the contoured portions of the third attachment plate 250 may be sized/shaped to substantially match an outer surface of the support structure 106. In this example, the fifth contoured portion 254 and the sixth contoured portion 256 can have rounded shapes that substantially match the rounded shape of the support structure 106. In an example, the fifth contoured portion 254 is located at an upper end of the third attachment plate 250 while the sixth contoured portion 256 is located at a lower end of the third attachment plate 250. As such, the fifth contoured portion 254 and the sixth contoured portion 256 are spaced a distance apart, with a recess, a gap, an opening, a channel, etc. defined therebetween.

The fourth attachment plate 252 comprises a seventh contoured portion 258 and an eighth contoured portion 260. The seventh contoured portion 258 and the eighth contoured portion 260 can project outwardly from a wall of the fourth attachment plate 252 towards the support structure 106. In an example, the contoured portions of the fourth attachment plate 252 may be sized/shaped to substantially match an outer surface of the support structure 106. In this example, the seventh contoured portion 258 and the eighth contoured portion 260 can have rounded shapes that substantially match the rounded shape of the support structure 106. In an example, the seventh contoured portion 258 is located at an upper end of the fourth attachment plate 252 while the eighth contoured portion 260 is located at a lower end of the fourth attachment plate 252. As such, the seventh contoured portion 258 and the eighth contoured portion 260 are spaced a distance apart, with a recess, a gap, an opening, a channel, etc. defined therebetween.

The third attachment plate 250 and the fourth attachment plate 252 can be spaced apart to define a second attachment opening 262 into which the support structure 106 is received. In this example, the support structure 106 can contact the fifth contoured portion 254 and the sixth contoured portion 256 of the third attachment plate 250, and the seventh contoured portion 258 and the eighth contoured portion 260 of the fourth attachment plate 252.

The second attachment bracket 112 may comprise one or more fasteners 266 that can couple the third attachment plate 250 and the fourth attachment plate 252. In an example, the one or more fasteners 266 can be positioned on opposing sides of the support structure 106, such that the support structure 106 is positioned between a first pair of fasteners and a second pair of fasteners. The fasteners 266 can extend through one or more openings in the third attachment plate 250 and the fourth attachment plate 252, such that when the fasteners 266 are tightened, the third attachment plate 250 and the fourth attachment plate 252 can exert a compressive force onto the support structure 106.

The second attachment bracket 112 can be selectively positioned in a locked position or an unlocked position relative to the support structure 106. For example, in the locked position, the fasteners 266 can be tightened such that the third attachment plate 250 and the fourth attachment plate 252 exert the compressive force onto the support structure 106. In the locked position, this compressive force may be sufficient such that the second attachment bracket 112 is fixed with respect to the support structure 106. In the unlocked position, the fasteners 266 may be loosened such that the third attachment plate 250 and the fourth attachment plate 252 do not exert enough of a compressive force onto the support structure 106 to fix the second attachment bracket 112 with respect to the support structure 106. Rather, in the unlocked position, the second attachment bracket 112 may be movable with respect to the support structure 106.

The attachment brackets may comprise one or more connection portions. In an example, the attachment bracket 110 comprises a connection portion 270. The connection portion 270 comprises a first connection plate 272 and a second connection plate 274. The first connection plate 272 and the second connection plate 274 may be spaced apart to define a connection portion opening 276 into which the attachment arm 114 may be received. In an example, the first connection plate 272 and the second connection plate 274 are attached to the first attachment plate 200 on an opposite side of the support structure 106. The first connection plate 272 and the second connection plate 274 can extend substantially parallel to each other in a direction that is substantially perpendicular to the first attachment plate 200. The first connection plate 272 and the second connection plate 274 can comprise one or more first openings 278 for receiving a fastener. The fasteners, when inserted through the first openings 278, can assist in attaching the attachment arm 114 to the attachment bracket 110.

The connection portion 270 comprises a third connection plate 280. The third connection plate 280 can be attached to the first connection plate 272, the second connection plate 274, and/or the first attachment plate 200. The third connection plate 280 can define a plane that is substantially perpendicular to planes defined by the first connection plate 272 and the second connection plate 274. The third connection plate 280 can be located at an upper end of the connection portion 270 adjacent to and/or co-planar with the first contoured portion 204. The third connection plate 280 may comprise one or more second openings 282 for receiving a fastener. The fasteners, when inserted through the second openings 282, can assist in attaching the support brace 124 and the second support brace 126 to the third connection plate 280.

In an example, the second attachment bracket 112 comprises a second connection portion 284. The second connection portion 284 comprises a first connection wall 286 and a second connection wall 288. The first connection wall 286 and the second connection wall 288 may be spaced apart to define a second connection opening 290 into which a portion of the third support brace 128 may be received. In an example, the first connection wall 286 and the second connection wall 288 are attached to the third attachment plate 250 on an opposite side of the support structure 106. The first connection wall 286 and the second connection wall 288 can extend substantially parallel to each other in a direction that is substantially perpendicular to the third attachment plate 250.

The first connection wall 286 and the second connection wall 288 can comprise one or more third openings 292 for receiving one or more fasteners. The fasteners, when inserted through the third openings 292, can assist in attaching the third support brace 128 to the second connection portion 284 of the second attachment bracket 112. In an example, a mounting structure can be inserted into the second connection opening 290, such that the mounting structure can be attached to the second connection portion 284. The third support brace 128 can be attached to the mounting structure (e.g., with a fastener), such that the third support brace 128 is attached to the second connection portion 284 through the mounting structure.

Figure 3:
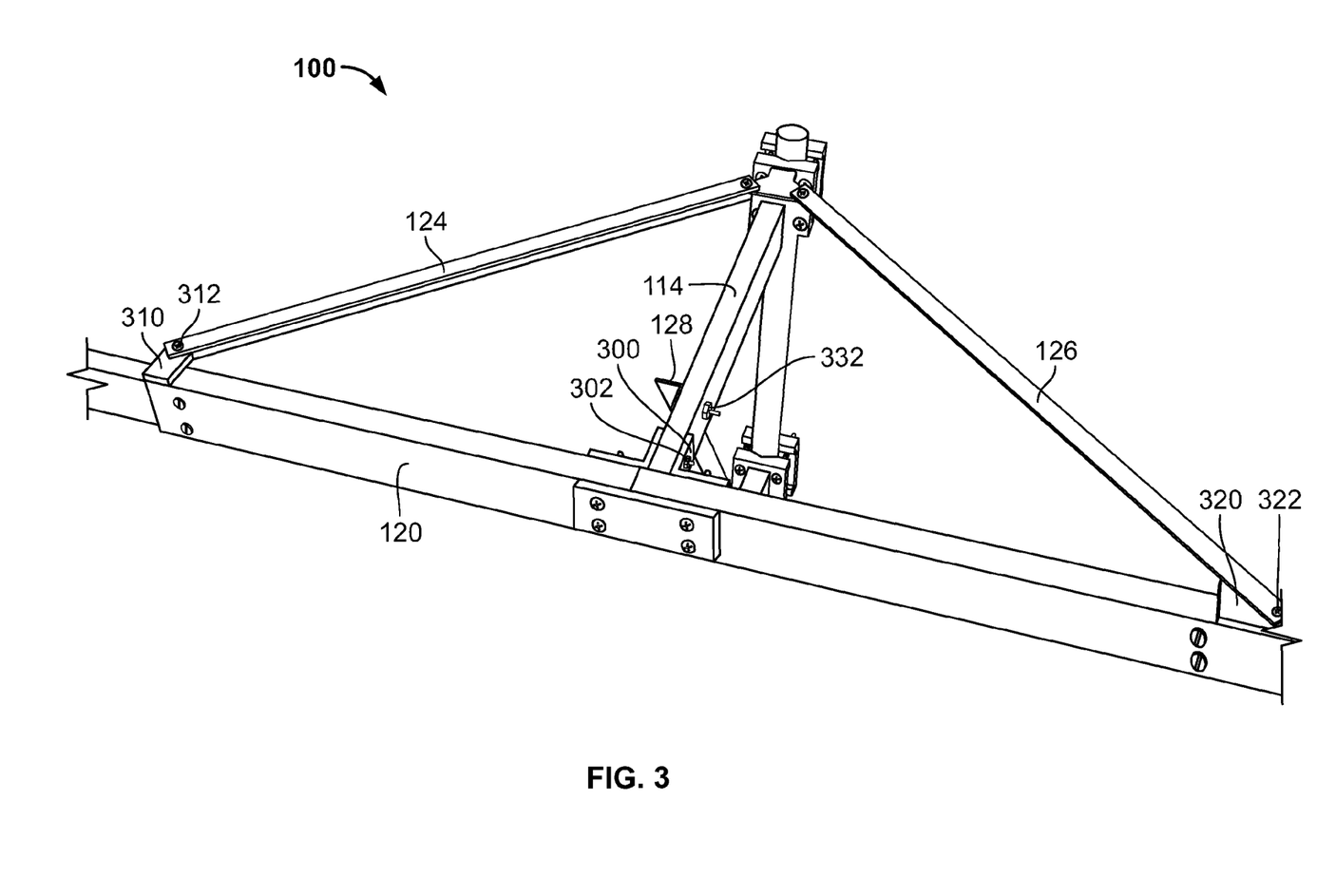
FIG. 3 is an illustration of a portion of an example mounting assembly.

Referring to FIG. 3, the attachment arm 114, the support brace 124, the second support brace 126, and the third support brace 128 may be attached to the support member 120. In an example, an arm attachment structure 300 may be provided for assisting in attaching the attachment arm 114 to the support member 120. In this example, the arm attachment structure 300 comprises one or more "L" shaped brackets (e.g., two walls that form a 90 degree angle). The arm attachment structure 300 can be positioned in contact with and adjacent to an end of the attachment arm 114 and the support member 120. One or more fasteners 302 can be received through openings in the arm attachment structure 300, such that a first portion of the fasteners 302 can be attached to the attachment arm 114 and a second portion of the fasteners 302 can be attached to the support member 120. Together, the fasteners 302 and the arm attachment structure 300 can attach the attachment arm 114 and the support member 120 in a substantially fixed and non-movable configuration.

In an example, the support brace 124 can be attached to the support member 120 by a first attachment structure 310. In an example, the first attachment structure 310 may comprise a substantially planar structure that is attached to the support member 120 at one end, and to the support brace 124 at an opposing end. The first attachment structure 310 can define one or more openings for receiving one or more fasteners 312. As such, a portion of the first attachment structure 310 can be attached to the support member 120 while another portion of the first attachment structure 310 can be attached to the support brace 124. In an example, the first attachment structure 310 can be located at an end of the support member 120.

In an example, the second support brace 126 can be attached to the support member 120 by a second attachment structure 320. In an example, the second attachment structure 320 may comprise a substantially planar structure that is attached to the support member 120 at one end, and to the second support brace 126 at an opposing end. The second attachment structure 320 can define one or more openings for receiving one or more fasteners 322. As such, a portion of the second attachment structure 320 can be attached to the support member 120 while another portion of the second attachment structure 320 can be attached to the second support brace 126. In an example, the second attachment structure 320 can be located at an end of the support member 120 opposite the first attachment structure 310.

In an example, one or more fasteners 332 can attach the third support brace 128 to the attachment arm 114. In an example, an end of the third support brace 128 can be attached to the attachment arm 114. An opening defined through the end of the third support brace 128 can be aligned with an opening defined through the attachment arm 114. These openings may be sized to receive the fastener 332 so as to attach the third support brace 128 to the attachment arm 114.

In an example, the support brace 124 may be pivotable with respect to the attachment bracket 110 at one end and the support member 120 at an opposing end. Likewise, in an example, the second support brace 126 may be pivotable with respect to the attachment bracket 110 at one end and the support member 120 at an opposing end. In an example, the third support brace 128 may be pivotable with respect to the second attachment bracket 112 and the attachment arm 114 at a second end.

Figure 4:
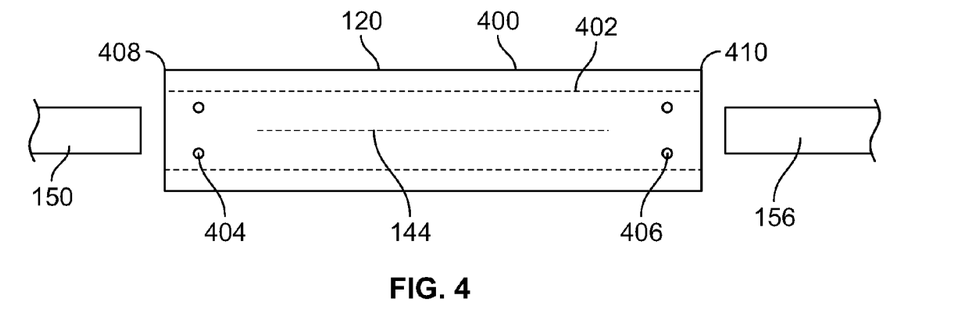
FIG. 4 is an illustration of a portion of an example mounting assembly.

Turning to FIG. 4, the support member 120 is illustrated detached from the support arm 150 and the second support arm 156. In this example, the support member 120 has a body 400 that defines a substantially hollow interior 402 that extends substantially co-axially along the support member axis 144. In an example, the substantially hollow interior 402 can extend along an entire length of the body 400 though, in other examples, the substantially hollow interior 402 may extend only partially along the length of the body 400. In some examples, the body 400 may define two or more substantially hollow interiors 402 that extend along the support member axis 144, such that one of the substantially hollow interiors 402 extends from one end of the body 400 while another of the substantially hollow interiors 402 extends from an opposing end of the body 400.

The substantially hollow interior 402 can have a cross-sectional size that is greater than or equal to a cross-sectional size of the support arm 150 and the second support arm 156. In an example, the support arm 150 can be received within the substantially hollow interior 402 of the support member 120. The support arm 150 is configured to be in a locked position or an unlocked position relative to the support member 120. In the locked position, the support arm 150 can be substantially fixed and non-movable with respect to the support member 120. In the unlocked position, the support arm 150 can be movable and non-fixed with respect to the support member 120.

The support member 120 can define one or more first support openings 404 that extend radially through the support member 120 from an exterior radial location of the support member 120 to the substantially hollow interior 402. The first support openings 404 may be sized to receive a fastener. When the support arm 150 is received within the substantially hollow interior 402 of the support member, the fastener can contact and/or engage the support arm 150 (e.g., such as by engaging an opening in the support arm 150). When the fastener engages the support arm 150, the support arm 150 may be in the locked position relative to the support member 120. The fastener can be removed and/or loosened such that the fastener may not contact and/or engage the support arm 150. As such, when the fastener does not engage the support arm 150, the support arm 150 may be in the unlocked position relative to the support member 120. In the unlocked position, the support arm 150 is configured to be movable with respect to the support member 120 along the support member axis 144.

In an example, the second support arm 156 can be received within the substantially hollow interior 402 of the support member 120. The second support arm 156 is configured to be in a locked position or an unlocked position relative to the support member 120. In the locked position, the second support arm 156 can be substantially fixed and non-movable with respect to the support member 120. In the unlocked position, the second support arm 156 can be movable and non-fixed with respect to the support member 120.

The support member 120 can define one or more second support openings 406 that extend radially through the support member 120 from an exterior radial location of the support member 120 to the substantially hollow interior 402. In this example, the first support openings 404 may be located adjacent a first end 408 of the body 400 while the second support openings 406 may be located adjacent a second end 410 of the body 400. The second support openings 406 may be sized to receive a fastener.

When the second support arm 156 is received within the substantially hollow interior 402 of the support member, the fastener can contact and/or engage the second support arm 156 (e.g., such as by engaging an opening in the second support arm 156). When the fastener engages the second support arm 156, the second support arm 156 may be in the locked position relative to the support member 120. The fastener can be removed and/or loosened such that the fastener may not contact and/or engage the second support arm 156. As such, when the fastener does not engage the second support arm 156, the second support arm 156 may be in the unlocked position relative to the support member 120. In the unlocked position, the second support arm 156 is configured to be movable with respect to the support member 120 along the support member axis 144.

Figure 5:
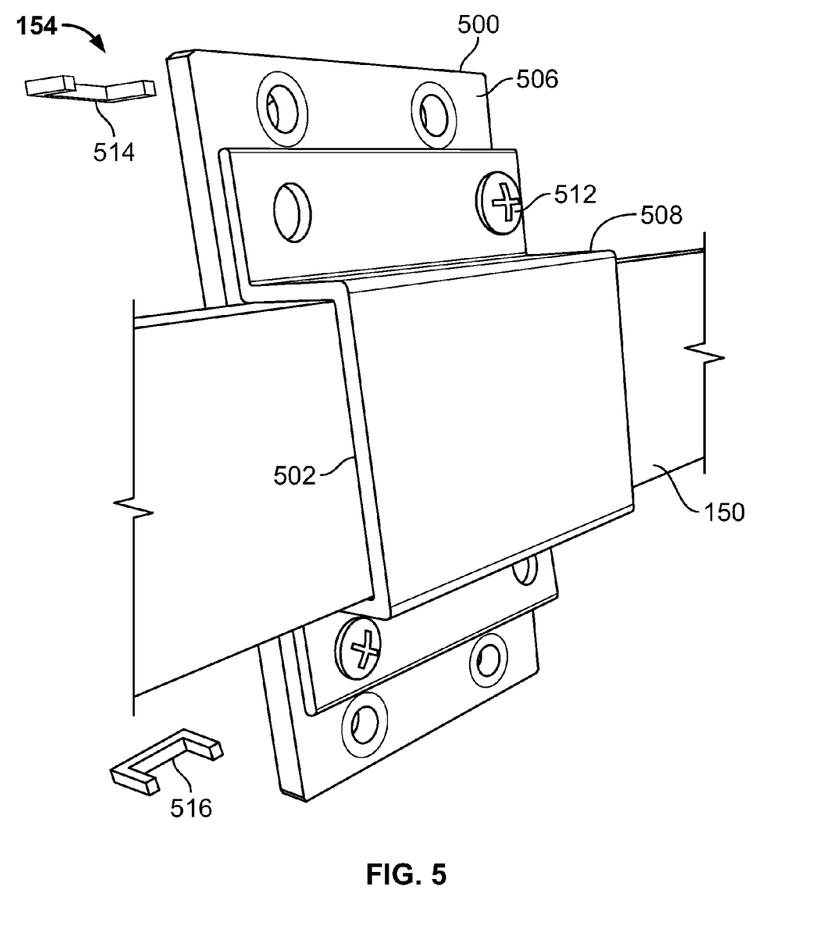
FIG. 5 is an illustration of a portion of an example mounting assembly.

Turning to FIG. 5, the antenna mounting bracket 154 is illustrated attached to the support arm 150. It will be appreciated that while the antenna mounting bracket 154 is illustrated in FIG. 5, the second antenna mounting bracket 160 may be substantially similar to the antenna mounting bracket 154. The antenna mounting bracket 154 can have a bracket body 500 that defines a substantially hollow bracket interior 502. In an example, the bracket interior 502 can extend substantially co-axially along the support member axis 144.

The bracket body 500 may comprise a first mounting plate 506 and a second mounting plate 508. The first mounting plate 506 can be substantially planar while the second mounting plate 508 may be non-planar. In an example, the first mounting plate 506 and the second mounting plate 508 can, together, define the bracket interior 502 into which the support arm 150 is received. In this example, the second mounting plate 508 can comprise a plurality of bent portions, wherein an upper portion and a lower portion of the second mounting plate 508 can be attached to the first mounting plate 506. In an example, one or more mounting plate fasteners 512 can couple the first mounting plate 506 and the second mounting plate 508.

The antenna mounting bracket 154 is configured to be in a locked position or an unlocked position relative to the support arm 150. For example, in the locked position, the mounting plate fasteners 512 can be tightened such that the first mounting plate 506 and the second mounting plate 508 exert a compressive force onto the support arm 150. In the locked position, this compressive force may be sufficient such that the antenna mounting bracket 154 is fixed with respect to the support arm 150. In the unlocked position, the mounting plate fasteners 512 may be loosened such that the first mounting plate 506 and the second mounting plate 508 do not exert enough of a compressive force onto the support arm 150 to fix the antenna mounting bracket 154 with respect to the support arm 150. Rather, in the unlocked position, the antenna mounting bracket 154 may be movable with respect to the support arm 150 along the support member axis 144.

The antenna mounting bracket 154 may comprise a first antenna fastener 514 and a second antenna fastener 516. The first antenna fastener 514 and the second antenna fastener 516 may comprise mechanical fasteners (e.g., U-bolts, U-shaped fasteners, etc.) or the like. The first antenna fastener 514 can extend through openings at an upper portion of the first mounting plate 506 while the second antenna fastener 516 can extend through openings at a lower portion of the first mounting plat 506. Together, the first antenna fastener 514 and the second antenna fastener 516 can assist in attaching the first antenna pole 102 to the antenna mounting bracket 154. In some examples, the first antenna fastener 514 and the second antenna fastener 516 can be selectively tightened and loosened, such that the first antenna pole 102 can be removed from, adjusted with respect to, etc. the antenna mounting bracket 154.

Figure 6:
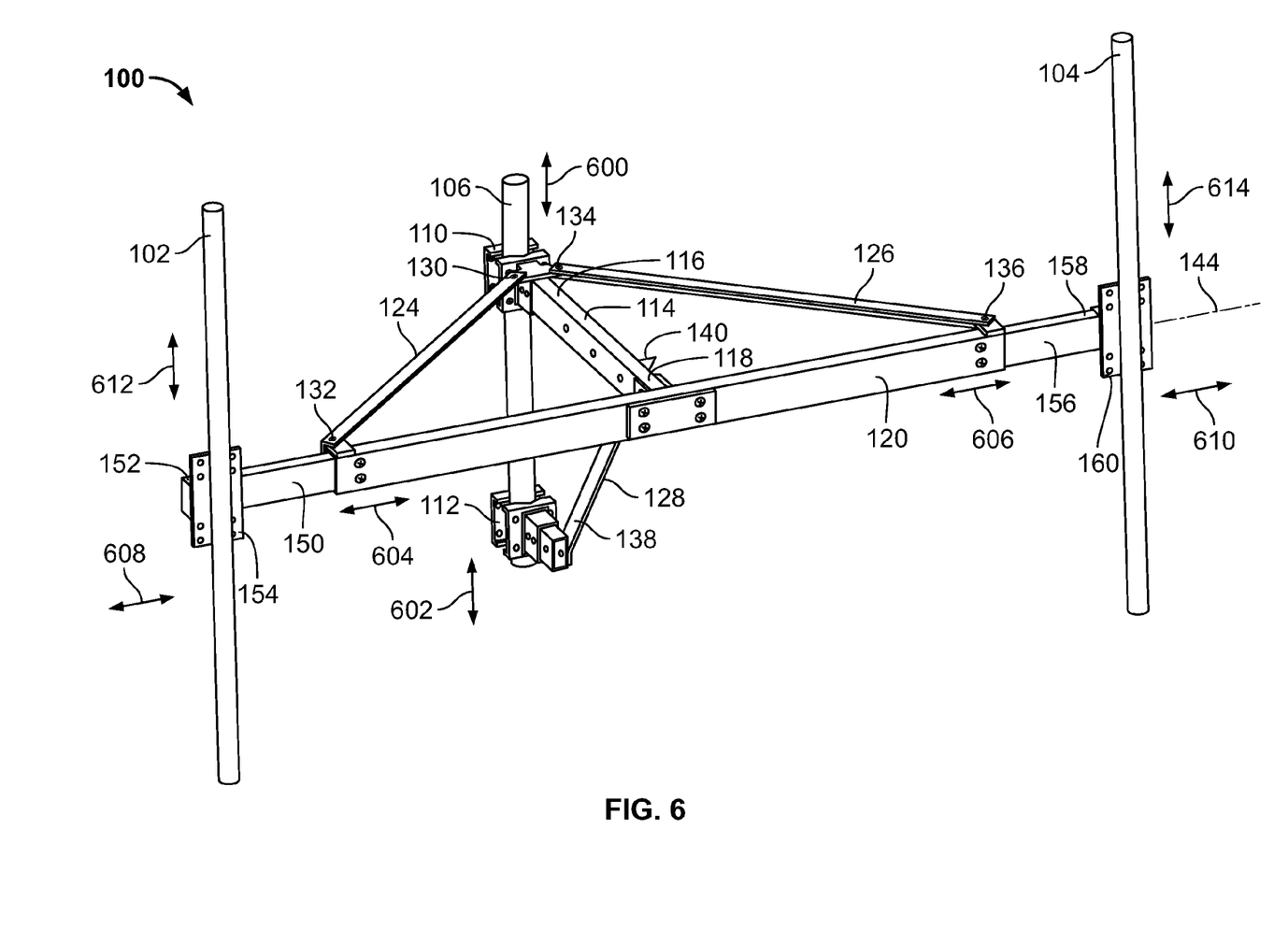
FIG. 6 is an illustration of an example mounting assembly.

Turning to FIG. 6, the mounting assembly 100 is illustrated. In this example, portions of the mounting assembly 100 are movable and adjustable. For example, when the attachment bracket 110 is in the unlocked position, the attachment bracket 110 is movable along a first direction 600 (e.g., up or down) with respect to the support structure 106. In an example, when the second attachment bracket 112 is in the unlocked position, the second attachment bracket 112 is movable along a second direction 602 (e.g., up or down) with respect to the support structure 106.

In an example, the support arm 150 and/or the second support arm 156 may be movable and adjustable with respect to the support member 120. For example, when the support arm 150 is in the unlocked position, the support arm 150 is movable along a third direction 604 with respect to the support member 120 along the support member axis 144. In this example, the third direction 604 is substantially perpendicular to the first direction 600 and/or the second direction 602. In an example, when the second support arm 156 is in the unlocked position, the second support arm 156 is movable along a fourth direction 606 with respect to the support member 120 along the support member axis 144. In this example, the fourth direction 606 is substantially perpendicular to the first direction 600 and/or the second direction 602.

In an example, the antenna mounting bracket 154 and/or the second antenna mounting bracket 160 may be movable and adjustable with respect to the support arm 150 and the second support arm 156, respectively. For example, when the antenna mounting bracket 154 is in the unlocked position, the antenna mounting bracket 154 is movable along a fifth direction 608 with respect to the support arm 150. In this example, the fifth direction 608 is substantially parallel to the third direction 604. In an example, when the second antenna mounting bracket 160 is in the unlocked position, the second antenna mounting bracket 160 is movable along a sixth direction 610 with respect to the second support arm 156. In this example, the sixth direction 610 is substantially perpendicular to the fourth direction 606.

In an example, the first antenna pole 102 and/or the second antenna pole 104 may be movable and adjustable with respect to the antenna mounting bracket 154 and the second antenna mounting bracket 160, respectively. For example, when the first antenna pole 102 is in the unlocked position, the first antenna pole 102 is movable along a seventh direction 612 with respect to the antenna mounting bracket 154. In this example, the seventh direction 612 is substantially parallel to the first direction 600 and the second direction 602. In an example, when the second antenna pole 104 is in the unlocked position, the second antenna pole 104 is movable along an eighth direction 614 with respect to the second antenna mounting bracket 158. In this example, the eighth direction 614 is substantially parallel to the first direction 600 and the second direction 602.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A mounting assembly for mounting an antenna to a support structure, the mounting assembly comprising:
    an attachment bracket configured to be coupled to the support structure;
    a support member coupled to the attachment bracket and extending along a support member axis, the support member having a body defining a substantially hollow interior that extends substantially co-axially along the support member axis;
    a support arm for supporting the antenna, the support arm received within the substantially hollow interior of the support member, the support arm configured to be in a locked position or an unlocked position relative to the support member, wherein in the locked position, the support arm is fixed with respect to the support member, wherein in the unlocked position, the support arm is configured to be movable with respect to the support member along the support member axis; and
    a second support arm for supporting a second antenna, the second support arm received within the substantially hollow interior of the support member.

2. The mounting assembly of claim 1, the attachment bracket comprising a first attachment plate and a second attachment plate spaced apart to define an attachment opening into which the support structure is received.

3. The mounting assembly of claim 2, the first attachment plate comprising a first contoured portion substantially matching a shape of the support structure, the second attachment plate comprising a third contoured portion substantially matching the shape of the support structure.

4. The mounting assembly of claim 1, the attachment bracket configured to be in a locked position or an unlocked position relative to the support structure, wherein in the locked position, the attachment bracket is fixed with respect to the support structure, wherein in the unlocked position, the attachment bracket is configured to be movable with respect to the support structure.

5. The mounting assembly of claim 1, comprising a second attachment bracket configured to be coupled to the support structure, the second attachment bracket spaced a distance apart from the attachment bracket.

6. The mounting assembly of claim 5, the second attachment bracket comprising a third attachment plate and a fourth attachment plate spaced apart to define a second attachment opening into which the support structure is received.

7. The mounting assembly of claim 6, the third attachment plate comprising a fifth contoured portion substantially matching a shape of the support structure, the fourth attachment plate comprising a sixth contoured portion substantially matching the shape of the support structure.

8. The mounting assembly of claim 5, the second attachment bracket configured to be in a locked position or an unlocked position relative to the support structure, wherein in the locked position, the second attachment bracket is fixed with respect to the support structure, wherein in the unlocked position, the second attachment bracket is configured to be movable with respect to the support structure.

9. The mounting assembly of claim 1, comprising an antenna mounting bracket for mounting the antenna to the support arm, the antenna mounting bracket having a bracket body defining a substantially hollow bracket interior that extends substantially co-axially along the support member axis, the support arm received within the substantially hollow bracket interior of the antenna mounting bracket.

10. The mounting assembly of claim 9, the antenna mounting bracket configured to be in a locked position or an unlocked position relative to the support arm, wherein in the locked position, the antenna mounting bracket is fixed with respect to the support arm, wherein in the unlocked position, the antenna mounting bracket is configured to be movable with respect to the support arm along the support member axis.

11. The mounting assembly of claim 1, the second support arm configured to be in a locked position or an unlocked position relative to the support member, wherein in the locked position, the second support arm is fixed with respect to the support member, wherein in the unlocked position, the second support arm is configured to be movable with respect to the support member.

12. A mounting assembly for mounting an antenna to a support structure, the mounting assembly comprising:
    an attachment bracket configured to be coupled to the support structure;
    a support member coupled to the attachment bracket and extending along a support member axis, the support member having a body defining a substantially hollow interior that extends substantially co-axially along the support member axis;
    a support arm received within the substantially hollow interior of the support member, the support arm configured to be movable with respect to the support member along the support member axis; and
    an antenna mounting bracket for mounting the antenna to the support arm, the antenna mounting bracket having a bracket body defining a substantially hollow bracket interior that extends substantially co-axially along the support member axis, the support arm received within the substantially hollow bracket interior of the antenna mounting bracket, the antenna mounting bracket configured to be in a locked position or an unlocked position relative to the support arm, wherein in the locked position, the antenna mounting bracket is fixed with respect to the support arm, wherein in the unlocked position, the antenna mounting bracket is configured to be movable with respect to the support arm along the support member axis.

13. The mounting assembly of claim 12, comprising a support brace coupled to the attachment bracket and the support member and a second support brace coupled to the attachment bracket and the support member.

14. The mounting assembly of claim 13, the support brace configured to extend substantially non-parallel with respect to the second support brace.

15. The mounting assembly of claim 12, comprising a second support arm for supporting a second antenna, the second support arm received within the substantially hollow interior of the support member.

16. A mounting assembly for mounting an antenna to a support structure, the mounting assembly comprising:
    an attachment bracket configured to be coupled to the support structure;
    a support member coupled to the attachment bracket and extending along a support member axis, the support member having a body defining a substantially hollow interior that extends substantially co-axially along the support member axis;
    a support arm for supporting the antenna, the support arm received within the substantially hollow interior of the support member, the support arm configured to be in a locked position or an unlocked position relative to the support member, wherein in the locked position, the support arm is fixed with respect to the support member, wherein in the unlocked position, the support arm is configured to be movable with respect to the support member along the support member axis; and
    an antenna mounting bracket for mounting the antenna to the support arm, the antenna mounting bracket having a bracket body defining a substantially hollow bracket interior that extends substantially co-axially along the support member axis, the support arm received within the substantially hollow bracket interior of the antenna mounting bracket.

17. The mounting assembly of claim 16, the antenna mounting bracket configured to be in a locked position or an unlocked position relative to the support arm, wherein in the locked position, the antenna mounting bracket is fixed with respect to the support arm, wherein in the unlocked position, the antenna mounting bracket is configured to be movable with respect to the support arm along the support member axis.

18. The mounting assembly of claim 16, comprising a second support arm for supporting a second antenna, the second support arm received within the substantially hollow interior of the support member.

19. The mounting assembly of claim 18, the second support arm configured to be in a locked position or an unlocked position relative to the support member, wherein in the locked position, the second support arm is fixed with respect to the support member, wherein in the unlocked position, the second support arm is configured to be movable with respect to the support member.

20. The mounting assembly of claim 16, the attachment bracket comprising a first attachment plate and a second attachment plate spaced apart to define an attachment opening into which the support structure is received.

* * * * *